US012702990B2

(12) United States Patent
Quinn et al.

(10) Patent No.: US 12,702,990 B2
(45) Date of Patent: Aug. 11, 2026

(54) ACTIVELY COOLED HEAT SINK FOR OVJP PRINT HEAD

(71) Applicant: Universal Display Corporation, Ewing, NJ (US)

(72) Inventors: William E. Quinn, Whitehouse Station, NJ (US); Craig Anthony Outten, Rydal, PA (US); Gregory McGraw, Yardley, PA (US); Kent Khuong Nguyen, San Jose, CA (US); Steven Shigeki Aochi, San Jose, CA (US); Neil D. Nguyen, Milpitas, CA (US); David Smiley, Morgan Hill, CA (US); Michael Filippi, Hayward, CA (US)

(73) Assignee: Universal Display Corporation, Ewing, NJ (US)

( * ) Notice: Subject to any disclaimer, the term of this patent is extended or adjusted under 35 U.S.C. 154(b) by 929 days.

(21) Appl. No.: 17/880,130

(22) Filed: Aug. 3, 2022

(65) Prior Publication Data

US 2023/0063757 A1 Mar. 2, 2023

Related U.S. Application Data

(60) Provisional application No. 63/263,393, filed on Nov. 2, 2021, provisional application No. 63/234,288, filed on Aug. 18, 2021.

(51) Int. Cl.
*B05B 7/16* (2006.01)

(52) U.S. Cl.
CPC .................................... *B05B 7/16* (2013.01)

(58) Field of Classification Search
USPC ............ 118/725, 726, 715, 724; 347/25, 26; 392/401
See application file for complete search history.

(56) References Cited

U.S. PATENT DOCUMENTS

| | | | |
|---|---|---|---|
| 4,769,292 | A | 9/1988 | Tang |
| 5,247,190 | A | 9/1993 | Friend |
| 5,703,436 | A | 12/1997 | Forrest |
| 5,707,745 | A | 1/1998 | Forrest |
| 5,834,893 | A | 11/1998 | Bulovic |

(Continued)

FOREIGN PATENT DOCUMENTS

| | | | | |
|---|---|---|---|---|
| CA | 3011260 | A1 * | 7/2017 | B29C 64/218 |
| CN | 102597299 | A | 7/2012 | |

(Continued)

OTHER PUBLICATIONS

English Translation CB-105900258A (Year: 2016).*

(Continued)

*Primary Examiner* — Yewebdar T Tadesse

(74) *Attorney, Agent, or Firm* — Butzel Long

(57) ABSTRACT

An organic vapor jet printing (OVJP) device is provided that includes an OVJP print head having a nozzle configured to eject an organic material entrained in a carrier gas, one or more heaters to heat the nozzle, and one or more heat sinks to remove heat from the region of the nozzle. OVJP deposition devices and techniques are also provided in which heat sinks are arranged in the region of one or more OVJP nozzle, which maintain an ambient temperature of not more than 40 C. when the print head is operated at an operating temperature of 450 C.

17 Claims, 7 Drawing Sheets

(56) References Cited

U.S. PATENT DOCUMENTS

| | | | | |
|---|---|---|---|---|
| 5,835,678 | A * | 11/1998 | Li | C23C 16/4486 392/394 |
| 5,844,363 | A | 12/1998 | Gu | |
| 6,013,982 | A | 1/2000 | Thompson | |
| 6,087,196 | A | 7/2000 | Sturm | |
| 6,091,195 | A | 7/2000 | Forrest | |
| 6,097,147 | A | 8/2000 | Baldo | |
| 6,294,398 | B1 | 9/2001 | Kim | |
| 6,303,238 | B1 | 10/2001 | Thompson | |
| 6,337,102 | B1 | 1/2002 | Forrest | |
| 6,468,819 | B1 | 10/2002 | Kim | |
| 6,537,688 | B2 | 3/2003 | Silvernail | |
| 6,597,111 | B2 | 7/2003 | Silvernail | |
| 6,664,137 | B2 | 12/2003 | Weaver | |
| 6,835,950 | B2 | 12/2004 | Brown | |
| 6,888,305 | B2 | 5/2005 | Weaver | |
| 6,888,307 | B2 | 5/2005 | Silvernail | |
| 6,897,474 | B2 | 5/2005 | Brown | |
| 6,981,760 | B2 * | 1/2006 | Yamamoto | B41J 2/14129 347/75 |
| 7,187,119 | B2 | 3/2007 | Weaver | |
| 7,279,704 | B2 | 10/2007 | Walters | |
| 7,431,968 | B1 | 10/2008 | Shtein | |
| 7,683,534 | B2 | 3/2010 | Weaver | |
| 7,968,146 | B2 | 6/2011 | Wagner | |
| 2003/0230980 | A1 | 12/2003 | Forrest | |
| 2004/0174116 | A1 | 9/2004 | Lu | |
| 2009/0135219 | A1 | 5/2009 | Nathan | |
| 2017/0229663 | A1 | 8/2017 | Tsai | |

FOREIGN PATENT DOCUMENTS

| | | | | |
|---|---|---|---|---|
| CN | 103538371 A | | 1/2014 | |
| CN | 104087113 A | * | 10/2014 | |
| CN | 105900258 A | * | 8/2016 | H01L 21/67393 |
| CN | 110985900 A | * | 4/2020 | F21V 29/70 |
| EP | 3819049 A1 | * | 5/2021 | B33Y 70/00 |
| JP | 2518559 Y2 | * | 11/1996 | |
| JP | 4228632 B2 | * | 2/2009 | |
| KR | 20040044534 | | 5/2004 | |
| KR | 20090055346 | | 6/2009 | |
| KR | 20100128479 | | 12/2010 | |
| WO | 03020999 A1 | | 3/2003 | |
| WO | 2008057394 A1 | | 5/2008 | |
| WO | 2010011390 A2 | | 1/2010 | |

OTHER PUBLICATIONS

English Translation CN-110985900A (Year: 2020).*
English Translation JP-2518559 Y2 (Year: 1996).*
English Translation CN-104087113A (Year: 2014).*
English Translation JP-4228632B2 (Year: 2009).*
English Translation JP-H07304167A (Year: 1995).*
Baldo et al. "Highly efficient phosphorescent emission from organic electroluminescent devices", Nature, vol. 395, pp. 151-154, 1998.
Baldo, et al., "Very high-efficiency green organic light-emitting devices based on electrophosphorescence", Applied Physics Letters, Jul. 5, 1999, 4 pp., vol. 75, No. 1, American Institute of Physics, Melville, NY, USA.
Korean Office Action (including English translation) issued in App. No. KR20220102577, dated Aug. 26, 2025, 7 pages.
Chinese Office Action issued in App. No. CN202210993877, dated Dec. 20, 2025, 6 pages.

* cited by examiner

FIG. 4A
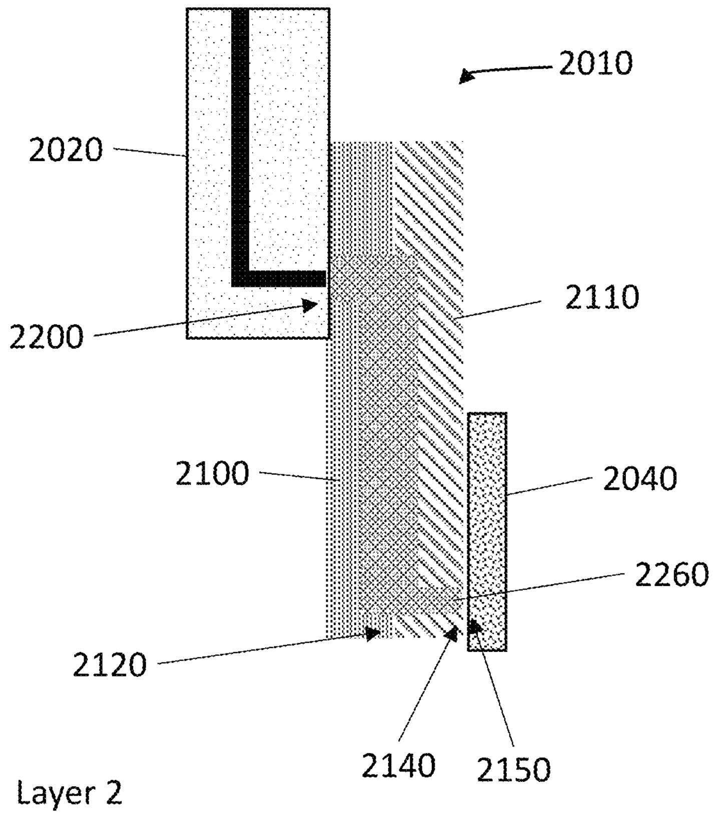
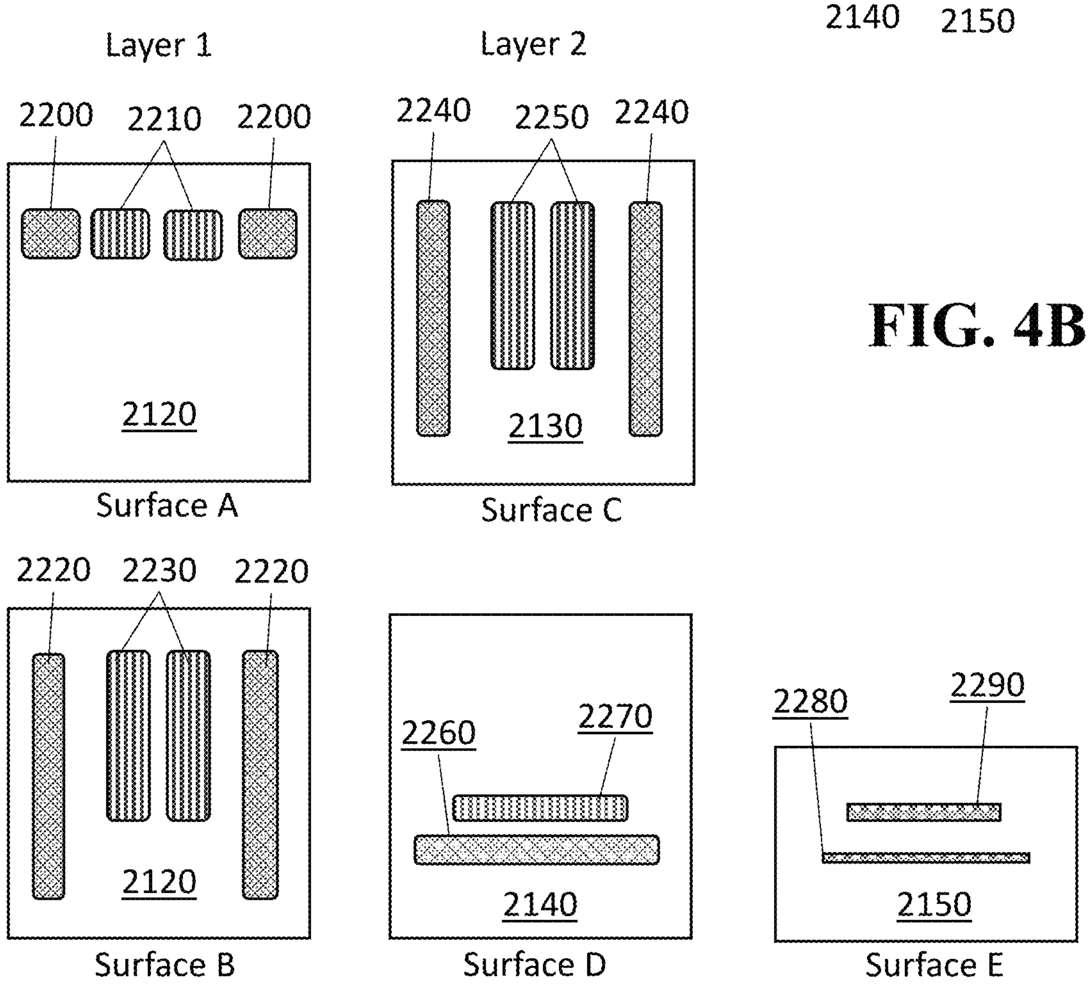
FIG. 4B

ACTIVELY COOLED HEAT SINK FOR OVJP PRINT HEAD

CROSS-REFERENCE TO RELATED APPLICATIONS

This application is a non-provisional of, and claims the priority benefit of, U.S. Provisional Patent Application Ser. No. 63/234,288, filed Aug. 18, 2021, and U.S. Provisional Patent Application Ser. No. 63/263,393, filed Nov. 2, 2021, the entire contents of each are incorporated herein by reference.

FIELD

The present invention relates to devices and techniques for fabricating organic emissive devices, such as organic light emitting diodes, and devices and techniques including the same.

BACKGROUND

Opto-electronic devices that make use of organic materials are becoming increasingly desirable for a number of reasons. Many of the materials used to make such devices are relatively inexpensive, so organic opto-electronic devices have the potential for cost advantages over inorganic devices. In addition, the inherent properties of organic materials, such as their flexibility, may make them well suited for particular applications such as fabrication on a flexible substrate. Examples of organic opto-electronic devices include organic light emitting diodes/devices (OLEDs), organic phototransistors, organic photovoltaic cells, and organic photodetectors. For OLEDs, the organic materials may have performance advantages over conventional materials. For example, the wavelength at which an organic emissive layer emits light may generally be readily tuned with appropriate dopants.

OLEDs make use of thin organic films that emit light when voltage is applied across the device. OLEDs are becoming an increasingly interesting technology for use in applications such as flat panel displays, illumination, and backlighting. Several OLED materials and configurations are described in U.S. Pat. Nos. 5,844,363, 6,303,238, and 5,707,745, which are incorporated herein by reference in their entirety.

One application for phosphorescent emissive molecules is a full color display. Industry standards for such a display call for pixels adapted to emit particular colors, referred to as "saturated" colors. In particular, these standards call for saturated red, green, and blue pixels. Alternatively the OLED can be designed to emit white light. In conventional liquid crystal displays emission from a white backlight is filtered using absorption filters to produce red, green and blue emission. The same technique can also be used with OLEDs. The white OLED can be either a single EML device or a stack structure. Color may be measured using CIE coordinates, which are well known to the art.

As used herein, the term "organic" includes polymeric materials as well as small molecule organic materials that may be used to fabricate organic opto-electronic devices. "Small molecule" refers to any organic material that is not a polymer, and "small molecules" may actually be quite large. Small molecules may include repeat units in some circumstances. For example, using a long chain alkyl group as a substituent does not remove a molecule from the "small molecule" class. Small molecules may also be incorporated into polymers, for example as a pendent group on a polymer backbone or as a part of the backbone. Small molecules may also serve as the core moiety of a dendrimer, which consists of a series of chemical shells built on the core moiety. The core moiety of a dendrimer may be a fluorescent or phosphorescent small molecule emitter. A dendrimer may be a "small molecule," and it is believed that all dendrimers currently used in the field of OLEDs are small molecules.

As used herein, "top" means furthest away from the substrate, while "bottom" means closest to the substrate. Where a first layer is described as "disposed over" a second layer, the first layer is disposed further away from substrate. There may be other layers between the first and second layer, unless it is specified that the first layer is "in contact with" the second layer. For example, a cathode may be described as "disposed over" an anode, even though there are various organic layers in between.

As used herein, "solution processible" means capable of being dissolved, dispersed, or transported in and/or deposited from a liquid medium, either in solution or suspension form.

A ligand may be referred to as "photoactive" when it is believed that the ligand directly contributes to the photoactive properties of an emissive material. A ligand may be referred to as "ancillary" when it is believed that the ligand does not contribute to the photoactive properties of an emissive material, although an ancillary ligand may alter the properties of a photoactive ligand.

As used herein, and as would be generally understood by one skilled in the art, a first "Highest Occupied Molecular Orbital" (HOMO) or "Lowest Unoccupied Molecular Orbital" (LUMO) energy level is "greater than" or "higher than" a second HOMO or LUMO energy level if the first energy level is closer to the vacuum energy level. Since ionization potentials (IP) are measured as a negative energy relative to a vacuum level, a higher HOMO energy level corresponds to an IP having a smaller absolute value (an IP that is less negative). Similarly, a higher LUMO energy level corresponds to an electron affinity (EA) having a smaller absolute value (an EA that is less negative). On a conventional energy level diagram, with the vacuum level at the top, the LUMO energy level of a material is higher than the HOMO energy level of the same material. A "higher" HOMO or LUMO energy level appears closer to the top of such a diagram than a "lower" HOMO or LUMO energy level.

As used herein, and as would be generally understood by one skilled in the art, a first work function is "greater than" or "higher than" a second work function if the first work function has a higher absolute value. Because work functions are generally measured as negative numbers relative to vacuum level, this means that a "higher" work function is more negative. On a conventional energy level diagram, with the vacuum level at the top, a "higher" work function is illustrated as further away from the vacuum level in the downward direction. Thus, the definitions of HOMO and LUMO energy levels follow a different convention than work functions.

Layers, materials, regions, and devices may be described herein in reference to the color of light they emit. In general, as used herein, an emissive region that is described as producing a specific color of light may include one or more emissive layers disposed over each other in a stack.

As used herein, a "red" layer, material, region, or device refers to one that emits light in the range of about 580-700 nm or having a highest peak in its emission spectrum in that region. Similarly, a "green" layer, material, region, or device refers to one that emits or has an emission spectrum with a peak wavelength in the range of about 500-600 nm; a "blue" layer, material, or device refers to one that emits or has an emission spectrum with a peak wavelength in the range of about 400-500 nm; and a "yellow" layer, material, region, or device refers to one that has an emission spectrum with a peak wavelength in the range of about 540-600 nm. In some arrangements, separate regions, layers, materials, regions, or devices may provide separate "deep blue" and a "light blue" light. As used herein, in arrangements that provide separate "light blue" and "deep blue", the "deep blue" component refers to one having a peak emission wavelength that is at least about 4 nm less than the peak emission wavelength of the "light blue" component. Typically, a "light blue" component has a peak emission wavelength in the range of about 465-500 nm, and a "deep blue" component has a peak emission wavelength in the range of about 400-470 nm, though these ranges may vary for some configurations. Similarly, a color altering layer refers to a layer that converts or modifies another color of light to light having a wavelength as specified for that color. For example, a "red" color filter refers to a filter that results in light having a wavelength in the range of about 580-700 nm. In general, there are two classes of color altering layers: color filters that modify a spectrum by removing unwanted wavelengths of light, and color changing layers that convert photons of higher energy to lower energy. A component "of a color" refers to a component that, when activated or used, produces or otherwise emits light having a particular color as previously described. For example, a "first emissive region of a first color" and a "second emissive region of a second color different than the first color" describes two emissive regions that, when activated within a device, emit two different colors as previously described.

As used herein, emissive materials, layers, and regions may be distinguished from one another and from other structures based upon light initially generated by the material, layer or region, as opposed to light eventually emitted by the same or a different structure. The initial light generation typically is the result of an energy level change resulting in emission of a photon. For example, an organic emissive material may initially generate blue light, which may be converted by a color filter, quantum dot or other structure to red or green light, such that a complete emissive stack or sub-pixel emits the red or green light. In this case the initial emissive material or layer may be referred to as a "blue" component, even though the sub-pixel is a "red" or "green" component.

In some cases, it may be preferable to describe the color of a component such as an emissive region, sub-pixel, color altering layer, or the like, in terms of 1931 CIE coordinates. For example, a yellow emissive material may have multiple peak emission wavelengths, one in or near an edge of the "green" region, and one within or near an edge of the "red" region as previously described. Accordingly, as used herein, each color term also corresponds to a shape in the 1931 CIE coordinate color space. The shape in 1931 CIE color space is constructed by following the locus between two color points and any additional interior points. For example, interior shape parameters for red, green, blue, and yellow may be defined as shown below:

| Color | CIE Shape Parameters |
|---|---|
| Central Red | Locus: [0.6270, 0.3725]; [0.7347, 0.2653];<br>Interior: [0.5086, 0.2657] |
| Central Green | Locus: [0.0326, 0.3530]; [0.3731, 0.6245];<br>Interior: [0.2268, 0.3321 |
| Central Blue | Locus: [0.1746, 0.0052]; [0.0326, 0.3530];<br>Interior: [0.2268, 0.3321] |
| Central Yellow | Locus: [0.373 I, 0.6245]; [0.6270, 0.3725];<br>Interior: [0.3 700, 0.4087]; [0.2886, 0.4572] |

More details on OLEDs, and the definitions described above, can be found in U.S. Pat. No. 7,279,704, which is incorporated herein by reference in its entirety.

SUMMARY

According to an embodiment, an organic light emitting diode/device (OLED) is also provided. The OLED can include an anode, a cathode, and an organic layer, disposed between the anode and the cathode. According to an embodiment, the organic light emitting device is incorporated into one or more device selected from a consumer product, an electronic component module, and/or a lighting panel.

In an embodiment, an organic vapor jet printing (OVJP) device is provided that includes an OVJP print head, which includes a nozzle configured to eject an organic material entrained in a carrier gas; a first heater disposed on a first side of the OVJP print head; and a second heater disposed on a second side of the OVJP print head, wherein the OVJP print head is disposed between the first and second heaters. The OVJP printing device also may include a first heat sink disposed adjacent to the first heater and separated from the first heater by a first air gap and a second heat sink disposed adjacent to the second heater and separated from the second heater by a second air gap. The print head may be surrounded by one or more bearings, such as gas bearings, flat plates, or the like, which may be separated from the print head by an air gap. The heat sinks may include passive cooling, such as copper blocks or plates, and/or active cooling, such as a water cooling loop. The print head, including the heat sink(s), heater(s), and nozzle, may be not more than 15 mm, more preferably 10 mm, more preferably 5-6 mm wide, for example in the region of the print head that extends through a gap in the bearings. The print head may be moveable independently of the heat sinks, such that the heat sinks may remain stationary relative to other components and/or the deposition chamber when the print head is moved, for example in a vertical direction between the bearings. The print head also may include multiple nozzles, heaters, and/or heat sinks, for example in a linear or rectangular array. Similarly, the deposition system may include multiple print heads.

In an embodiment, a method of operating an OVJP print head is provided which includes heating the print head to at least about 200-450 C. within a vacuum chamber; depositing a material on a substrate via the print head; and removing sufficient heat from the local environment around the print head that an operating ambient temperature of the vacuum chamber is not more than 40 C. The heat may be removed via one or more heat sinks as described with respect to the print head.

In an embodiment, an OVJP device is provided that includes an OVJP print head; and one or more heat sinks in thermal contact with the OVJP print head and having a heat removal capacity sufficient to maintain an ambient temperature of not more than 40 C. when the print head is operated at an operating temperature of 450 C. The heat sink may include active cooling components, such as one or more of water-cooled plates disposed adjacent to the print head and separated from the print head by an air gap.

BRIEF DESCRIPTION OF THE DRAWINGS

FIGS. 4A and 4B shows a method of fabrication a low profile OVJP print head according to embodiments disclosed herein.

DETAILED DESCRIPTION

Generally, an OLED comprises at least one organic layer disposed between and electrically connected to an anode and a cathode. When a current is applied, the anode injects holes and the cathode injects electrons into the organic layer(s). The injected holes and electrons each migrate toward the oppositely charged electrode. When an electron and hole localize on the same molecule, an "exciton," which is a localized electron-hole pair having an excited energy state, is formed. Light is emitted when the exciton relaxes via a photoemissive mechanism. In some cases, the exciton may be localized on an excimer or an exciplex. Non-radiative mechanisms, such as thermal relaxation, may also occur, but are generally considered undesirable.

The initial OLEDs used emissive molecules that emitted light from their singlet states ("fluorescence") as disclosed, for example, in U.S. Pat. No. 4,769,292, which is incorporated by reference in its entirety. Fluorescent emission generally occurs in a time frame of less than 10 nanoseconds.

More recently, OLEDs having emissive materials that emit light from triplet states ("phosphorescence") have been demonstrated. Baldo et al., "Highly Efficient Phosphorescent Emission from Organic Electroluminescent Devices," Nature, vol. 395, 151-154, 1998; ("Baldo-I") and Baldo et al., "Very high-efficiency green organic light-emitting devices based on electrophosphorescence," Appl. Phys. Lett., vol. 75, No. 3, 4-6 (1999) ("Baldo-II"), are incorporated by reference in their entireties. Phosphorescence is described in more detail in U.S. Pat. No. 7,279,704 at cols. 5-6, which are incorporated by reference.

Figure 1:
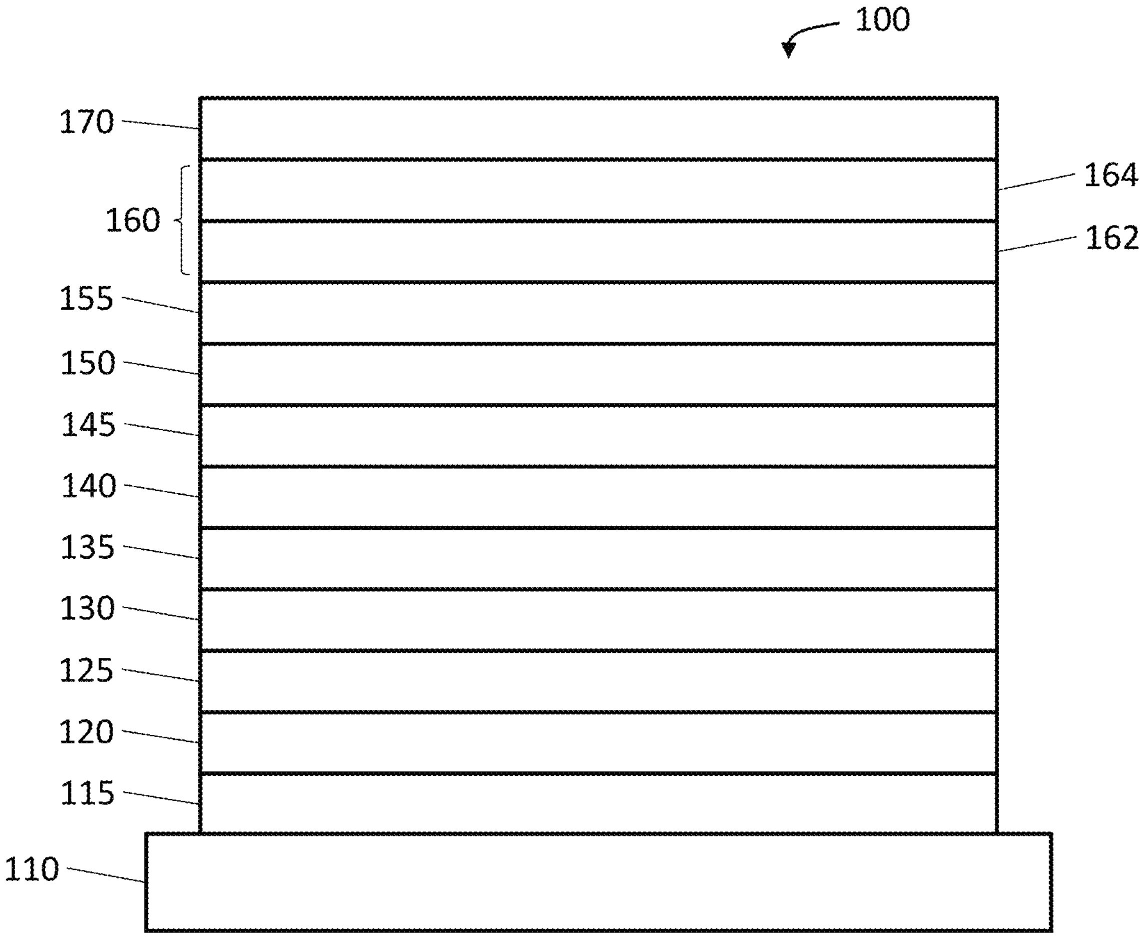
FIG. 1 shows an organic light emitting device that may be fabricated according to systems and techniques as disclosed herein.

FIG. 1 shows an organic light emitting device 100. The figures are not necessarily drawn to scale. Device 100 may include a substrate 110, an anode 115, a hole injection layer 120, a hole transport layer 125, an electron blocking layer 130, an emissive layer 135, a hole blocking layer 140, an electron transport layer 145, an electron injection layer 150, a protective layer 155, a cathode 160, and a barrier layer 170. Cathode 160 is a compound cathode having a first conductive layer 162 and a second conductive layer 164. Device 100 may be fabricated by depositing the layers described, in order. The properties and functions of these various layers, as well as example materials, are described in more detail in U.S. Pat. No. 7,279,704 at cols. 6-10, which are incorporated by reference.

More examples for each of these layers are available. For example, a flexible and transparent substrate-anode combination is disclosed in U.S. Pat. No. 5,844,363, which is incorporated by reference in its entirety. An example of a p-doped hole transport layer is m-MTDATA doped with $F_4$-TCNQ at a molar ratio of 50:1, as disclosed in U.S. Patent Application Publication No. 2003/0230980, which is incorporated by reference in its entirety. Examples of emissive and host materials are disclosed in U.S. Pat. No. 6,303,238 to Thompson et al., which is incorporated by reference in its entirety. An example of an n-doped electron transport layer is BPhen doped with Li at a molar ratio of 1:1, as disclosed in U.S. Patent Application Publication No. 2003/0230980, which is incorporated by reference in its entirety. U.S. Pat. Nos. 5,703,436 and 5,707,745, which are incorporated by reference in their entireties, disclose examples of cathodes including compound cathodes having a thin layer of metal such as Mg:Ag with an overlying transparent, electrically-conductive, sputter-deposited ITO layer. The theory and use of blocking layers is described in more detail in U.S. Pat. No. 6,097,147 and U.S. Patent Application Publication No. 2003/0230980, which are incorporated by reference in their entireties. Examples of injection layers are provided in U.S. Patent Application Publication No. 2004/0174116, which is incorporated by reference in its entirety. A description of protective layers may be found in U.S. Patent Application Publication No. 2004/0174116, which is incorporated by reference in its entirety.

Figure 2:
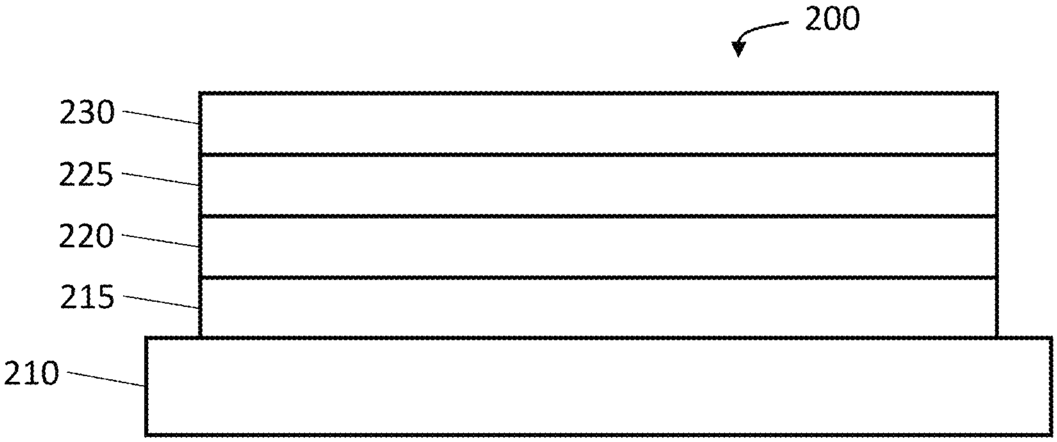
FIG. 2 shows an inverted organic light emitting device that does not have a separate electron transport layer, which may be fabricated according to systems and techniques as disclosed herein.

FIG. 2 shows an inverted OLED 200. The device includes a substrate 210, a cathode 215, an emissive layer 220, a hole transport layer 225, and an anode 230. Device 200 may be fabricated by depositing the layers described, in order. Because the most common OLED configuration has a cathode disposed over the anode, and device 200 has cathode 215 disposed under anode 230, device 200 may be referred to as an "inverted" OLED. Materials similar to those described with respect to device 100 may be used in the corresponding layers of device 200. FIG. 2 provides one example of how some layers may be omitted from the structure of device 100.

The simple layered structure illustrated in FIGS. 1 and 2 is provided by way of non-limiting example, and it is understood that embodiments of the invention may be used in connection with a wide variety of other structures. The specific materials and structures described are exemplary in nature, and other materials and structures may be used. Functional OLEDs may be achieved by combining the various layers described in different ways, or layers may be omitted entirely, based on design, performance, and cost factors. Other layers not specifically described may also be included. Materials other than those specifically described may be used. Although many of the examples provided herein describe various layers as comprising a single material, it is understood that combinations of materials, such as a mixture of host and dopant, or more generally a mixture, may be used. Also, the layers may have various sublayers. The names given to the various layers herein are not intended to be strictly limiting. For example, in device 200, hole transport layer 225 transports holes and injects holes into emissive layer 220, and may be described as a hole transport layer or a hole injection layer. In one embodiment, an OLED may be described as having an "organic layer" disposed between a cathode and an anode. This organic layer may comprise a single layer, or may further comprise multiple layers of different organic materials as described, for example, with respect to FIGS. 1 and 2.

Structures and materials not specifically described may also be used, such as OLEDs comprised of polymeric materials (PLEDs) such as disclosed in U.S. Pat. No. 5,247,190 to Friend et al., which is incorporated by reference in its entirety. By way of further example, OLEDs having a single organic layer may be used. OLEDs may be stacked, for example as described in U.S. Pat. No. 5,707,745 to Forrest et al, which is incorporated by reference in its entirety. The OLED structure may deviate from the simple layered structure illustrated in FIGS. 1 and 2. For example, the substrate may include an angled reflective surface to improve outcoupling, such as a mesa structure as described in U.S. Pat. No. 6,091,195 to Forrest et al., and/or a pit structure as described in U.S. Pat. No. 5,834,893 to Bulovic et al., which are incorporated by reference in their entireties.

In some embodiments disclosed herein, emissive layers or materials, such as emissive layer 135 and emissive layer 220 shown in FIGS. 1-2, respectively, may include quantum dots. An "emissive layer" or "emissive material" as disclosed herein may include an organic emissive material and/or an emissive material that contains quantum dots or equivalent structures, unless indicated to the contrary explicitly or by context according to the understanding of one of skill in the art. Such an emissive layer may include only a quantum dot material which converts light emitted by a separate emissive material or other emitter, or it may also include the separate emissive material or other emitter, or it may emit light itself directly from the application of an electric current. Similarly, a color altering layer, color filter, upconversion, or downconversion layer or structure may include a material containing quantum dots, though such layer may not be considered an "emissive layer" as disclosed herein. In general, an "emissive layer" or material is one that emits an initial light, which may be altered by another layer such as a color filter or other color altering layer that does not itself emit an initial light within the device, but may re-emit altered light of a different spectra content based upon initial light emitted by the emissive layer.

Unless otherwise specified, any of the layers of the various embodiments may be deposited by any suitable method. For the organic layers, preferred methods include thermal evaporation, ink-jet, such as described in U.S. Pat. Nos. 6,013,982 and 6,087,196, which are incorporated by reference in their entireties, organic vapor phase deposition (OVPD), such as described in U.S. Pat. No. 6,337,102 to Forrest et al., which is incorporated by reference in its entirety, and deposition by organic vapor jet printing (OVJP), such as described in U.S. Pat. No. 7,431,968, which is incorporated by reference in its entirety. Other suitable deposition methods include spin coating and other solution based processes. Solution based processes are preferably carried out in nitrogen or an inert atmosphere. For the other layers, preferred methods include thermal evaporation. Preferred patterning methods include deposition through a mask, cold welding such as described in U.S. Pat. Nos. 6,294,398 and 6,468,819, which are incorporated by reference in their entireties, and patterning associated with some of the deposition methods such as ink-jet and OVJD. Other methods may also be used. The materials to be deposited may be modified to make them compatible with a particular deposition method. For example, substituents such as alkyl and aryl groups, branched or unbranched, and preferably containing at least 3 carbons, may be used in small molecules to enhance their ability to undergo solution processing. Substituents having 20 carbons or more may be used, and 3-20 carbons is a preferred range. Materials with asymmetric structures may have better solution processibility than those having symmetric structures, because asymmetric materials may have a lower tendency to recrystallize. Dendrimer substituents may be used to enhance the ability of small molecules to undergo solution processing.

Devices fabricated in accordance with embodiments of the present invention may further optionally comprise a barrier layer. One purpose of the barrier layer is to protect the electrodes and organic layers from damaging exposure to harmful species in the environment including moisture, vapor and/or gases, etc. The barrier layer may be deposited over, under or next to a substrate, an electrode, or over any other parts of a device including an edge. The barrier layer may comprise a single layer, or multiple layers. The barrier layer may be formed by various known chemical vapor deposition techniques and may include compositions having a single phase as well as compositions having multiple phases. Any suitable material or combination of materials may be used for the barrier layer. The barrier layer may incorporate an inorganic or an organic compound or both. The preferred barrier layer comprises a mixture of a polymeric material and a non-polymeric material as described in U.S. Pat. No. 7,968,146, PCT Pat. Application Nos. PCT/US2007/023098 and PCT/US2009/042829, which are herein incorporated by reference in their entireties. To be considered a "mixture", the aforesaid polymeric and non-polymeric materials comprising the barrier layer should be deposited under the same reaction conditions and/or at the same time. The weight ratio of polymeric to non-polymeric material may be in the range of 95:5 to 5:95. The polymeric material and the non-polymeric material may be created from the same precursor material. In one example, the mixture of a polymeric material and a non-polymeric material consists essentially of polymeric silicon and inorganic silicon.

In some embodiments, at least one of the anode, the cathode, or a new layer disposed over the organic emissive layer functions as an enhancement layer. The enhancement layer comprises a plasmonic material exhibiting surface plasmon resonance that non-radiatively couples to the emitter material and transfers excited state energy from the emitter material to non-radiative mode of surface plasmon polariton. The enhancement layer is provided no more than a threshold distance away from the organic emissive layer, wherein the emitter material has a total non-radiative decay rate constant and a total radiative decay rate constant due to the presence of the enhancement layer and the threshold distance is where the total non-radiative decay rate constant is equal to the total radiative decay rate constant. In some embodiments, the OLED further comprises an outcoupling layer. In some embodiments, the outcoupling layer is disposed over the enhancement layer on the opposite side of the organic emissive layer. In some embodiments, the outcoupling layer is disposed on opposite side of the emissive layer from the enhancement layer but still outcouples energy from the surface plasmon mode of the enhancement layer. The outcoupling layer scatters the energy from the surface plasmon polaritons. In some embodiments this energy is scattered as photons to free space. In other embodiments, the energy is scattered from the surface plasmon mode into other modes of the device such as but not limited to the organic waveguide mode, the substrate mode, or another waveguiding mode. If energy is scattered to the non-free space mode of the OLED other outcoupling schemes could be incorporated to extract that energy to free space. In some embodiments, one or more intervening layer can be disposed between the enhancement layer and the outcoupling layer. The examples for interventing layer(s) can be dielectric materials, including organic, inorganic, perovskites, oxides, and may include stacks and/or mixtures of these materials.

The enhancement layer modifies the effective properties of the medium in which the emitter material resides resulting in any or all of the following: a decreased rate of emission, a modification of emission line-shape, a change in emission intensity with angle, a change in the stability of the emitter material, a change in the efficiency of the OLED, and reduced efficiency roll-off of the OLED device. Placement of the enhancement layer on the cathode side, anode side, or on both sides results in OLED devices which take advantage of any of the above-mentioned effects. In addition to the specific functional layers mentioned herein and illustrated in the various OLED examples shown in the figures, the OLEDs according to the present disclosure may include any of the other functional layers often found in OLEDs.

The enhancement layer can be comprised of plasmonic materials, optically active metamaterials, or hyperbolic metamaterials. As used herein, a plasmonic material is a material in which the real part of the dielectric constant crosses zero in the visible or ultraviolet region of the electromagnetic spectrum. In some embodiments, the plasmonic material includes at least one metal. In such embodiments the metal may include at least one of Ag, Al, Au, Ir, Pt, Ni, Cu, W, Ta, Fe, Cr, Mg, Ga, Rh, Ti, Ru, Pd, In, Bi, Ca alloys or mixtures of these materials, and stacks of these materials. In general, a metamaterial is a medium composed of different materials where the medium as a whole acts differently than the sum of its material parts. In particular, we define optically active metamaterials as materials which have both negative permittivity and negative permeability. Hyperbolic metamaterials, on the other hand, are anisotropic media in which the permittivity or permeability are of different sign for different spatial directions. Optically active metamaterials and hyperbolic metamaterials are strictly distinguished from many other photonic structures such as Distributed Bragg Reflectors ("DBRs") in that the medium should appear uniform in the direction of propagation on the length scale of the wavelength of light. Using terminology that one skilled in the art can understand: the dielectric constant of the metamaterials in the direction of propagation can be described with the effective medium approximation. Plasmonic materials and metamaterials provide methods for controlling the propagation of light that can enhance OLED performance in a number of ways.

In some embodiments, the enhancement layer is provided as a planar layer. In other embodiments, the enhancement layer has wavelength-sized features that are arranged periodically, quasi-periodically, or randomly, or sub-wavelength-sized features that are arranged periodically, quasi-periodically, or randomly. In some embodiments, the wavelength-sized features and the sub-wavelength-sized features have sharp edges.

In some embodiments, the outcoupling layer has wavelength-sized features that are arranged periodically, quasi-periodically, or randomly, or sub-wavelength-sized features that are arranged periodically, quasi-periodically, or randomly. In some embodiments, the outcoupling layer may be composed of a plurality of nanoparticles and in other embodiments the outcoupling layer is composed of a plurality of nanoparticles disposed over a material. In these embodiments the outcoupling may be tunable by at least one of varying a size of the plurality of nanoparticles, varying a shape of the plurality of nanoparticles, changing a material of the plurality of nanoparticles, adjusting a thickness of the material, changing the refractive index of the material or an additional layer disposed on the plurality of nanoparticles, varying a thickness of the enhancement layer, and/or varying the material of the enhancement layer. The plurality of nanoparticles of the device may be formed from at least one of metal, dielectric material, semiconductor materials, an alloy of metal, a mixture of dielectric materials, a stack or layering of one or more materials, and/or a core of one type of material and that is coated with a shell of a different type of material. In some embodiments, the outcoupling layer is composed of at least metal nanoparticles wherein the metal is selected from the group consisting of Ag, Al, Au, Ir, Pt, Ni, Cu, W, Ta, Fe, Cr, Mg, Ga, Rh, Ti, Ru, Pd, In, Bi, Ca, alloys or mixtures of these materials, and stacks of these materials. The plurality of nanoparticles may have additional layer disposed over them. In some embodiments, the polarization of the emission can be tuned using the outcoupling layer. Varying the dimensionality and periodicity of the outcoupling layer can select a type of polarization that is preferentially outcoupled to air. In some embodiments the outcoupling layer also acts as an electrode of the device.

It is believed that the internal quantum efficiency (IQE) of fluorescent OLEDs can exceed the 25% spin statistics limit through delayed fluorescence. As used herein, there are two types of delayed fluorescence, i.e. P-type delayed fluorescence and E-type delayed fluorescence. P-type delayed fluorescence is generated from triplet-triplet annihilation (TTA).

On the other hand, E-type delayed fluorescence does not rely on the collision of two triplets, but rather on the thermal population between the triplet states and the singlet excited states. Compounds that are capable of generating E-type delayed fluorescence are required to have very small singlet-triplet gaps. Thermal energy can activate the transition from the triplet state back to the singlet state. This type of delayed fluorescence is also known as thermally activated delayed fluorescence (TADF). A distinctive feature of TADF is that the delayed component increases as temperature rises due to the increased thermal energy. If the reverse intersystem crossing rate is fast enough to minimize the non-radiative decay from the triplet state, the fraction of back populated singlet excited states can potentially reach 75%. The total singlet fraction can be 100%, far exceeding the spin statistics limit for electrically generated excitons.

E-type delayed fluorescence characteristics can be found in an exciplex system or in a single compound. Without being bound by theory, it is believed that E-type delayed fluorescence requires the luminescent material to have a small singlet-triplet energy gap ($\Delta E_{S-T}$). Organic, non-metal containing, donor-acceptor luminescent materials may be able to achieve this. The emission in these materials is often characterized as a donor-acceptor charge-transfer (CT) type emission. The spatial separation of the HOMO and LUMO in these donor-acceptor type compounds often results in small ΔES-T. These states may involve CT states. Often, donor-acceptor luminescent materials are constructed by connecting an electron donor moiety such as amino- or carbazole-derivatives and an electron acceptor moiety such as N-containing six-membered aromatic ring.

Devices fabricated in accordance with embodiments of the invention can be incorporated into a wide variety of electronic component modules (or units) that can be incorporated into a variety of electronic products or intermediate components. Examples of such electronic products or intermediate components include display screens, lighting devices such as discrete light source devices or lighting panels, etc. that can be utilized by the end-user product manufacturers. Such electronic component modules can optionally include the driving electronics and/or power source(s). Devices fabricated in accordance with embodiments of the invention can be incorporated into a wide variety of consumer products that have one or more of the electronic component modules (or units) incorporated therein. A consumer product comprising an OLED that includes the compound of the present disclosure in the organic layer in the OLED is disclosed. Such consumer products would include any kind of products that include one or more light source(s) and/or one or more of some type of visual displays. Some examples of such consumer products include a flat panel display, a curved display, a computer monitor, a medical monitor, a television, a billboard, a light for interior or exterior illumination and/or signaling, a heads-up display, a fully or partially transparent display, a flexible display, a rollable display, a foldable display, a stretchable display, a laser printer, a telephone, a cell phone, tablet, a phablet, a personal digital assistant (PDA), a wearable device, a laptop computer, a digital camera, a camcorder, a viewfinder, a micro-display that is less than 2 inches diagonal, a 3-D display, a virtual reality or augmented reality display, a vehicle, a video walls comprising multiple displays tiled together, a theater or stadium screen, and a sign. Various control mechanisms may be used to control devices fabricated in accordance with the present invention, including passive matrix and active matrix. Many of the devices are intended for use in a temperature range comfortable to humans, such as 18 C. to 30 C., and more preferably at room temperature (20-25 C.), but could be used outside this temperature range, for example, from −40 C. to 80 C.

The materials and structures described herein may have applications in devices other than OLEDs. For example, other optoelectronic devices such as organic solar cells and organic photodetectors may employ the materials and structures. More generally, organic devices, such as organic transistors, may employ the materials and structures.

In some embodiments, the OLED has one or more characteristics selected from the group consisting of being flexible, being rollable, being foldable, being stretchable, and being curved. In some embodiments, the OLED is transparent or semi-transparent. In some embodiments, the OLED further comprises a layer comprising carbon nanotubes.

In some embodiments, the OLED further comprises a layer comprising a delayed fluorescent emitter. In some embodiments, the OLED comprises a RGB pixel arrangement or white plus color filter pixel arrangement. In some embodiments, the OLED is a mobile device, a hand held device, or a wearable device. In some embodiments, the OLED is a display panel having less than 10 inch diagonal or 50 square inch area. In some embodiments, the OLED is a display panel having at least 10 inch diagonal or 50 square inch area. In some embodiments, the OLED is a lighting panel.

In some embodiments of the emissive region, the emissive region further comprises a host.

In some embodiments, the compound can be an emissive dopant. In some embodiments, the compound can produce emissions via phosphorescence, fluorescence, thermally activated delayed fluorescence, i.e., TADF (also referred to as E-type delayed fluorescence), triplet-triplet annihilation, or combinations of these processes.

The OLED disclosed herein can be incorporated into one or more of a consumer product, an electronic component module, and a lighting panel. The organic layer can be an emissive layer and the compound can be an emissive dopant in some embodiments, while the compound can be a non-emissive dopant in other embodiments.

The organic layer can also include a host. In some embodiments, two or more hosts are preferred. In some embodiments, the hosts used maybe a) bipolar, b) electron transporting, c) hole transporting or d) wide band gap materials that play little role in charge transport. In some embodiments, the host can include a metal complex. The host can be an inorganic compound.

Combination with Other Materials

The materials described herein as useful for a particular layer in an organic light emitting device may be used in combination with a wide variety of other materials present in the device. For example, emissive dopants disclosed herein may be used in conjunction with a wide variety of hosts, transport layers, blocking layers, injection layers, electrodes and other layers that may be present. The materials described or referred to below are non-limiting examples of materials that may be useful in combination with the compounds disclosed herein, and one of skill in the art can readily consult the literature to identify other materials that may be useful in combination.

Various materials may be used for the various emissive and non-emissive layers and arrangements disclosed herein. Examples of suitable materials are disclosed in U.S. Patent Application Publication No. 2017/0229663, which is incorporated by reference in its entirety.

Conductivity Dopants:

A charge transport layer can be doped with conductivity dopants to substantially alter its density of charge carriers, which will in turn alter its conductivity. The conductivity is increased by generating charge carriers in the matrix material, and depending on the type of dopant, a change in the Fermi level of the semiconductor may also be achieved. Hole-transporting layer can be doped by p-type conductivity dopants and n-type conductivity dopants are used in the electron-transporting layer.

HIL/HTL:

A hole injecting/transporting material to be used in the present invention is not particularly limited, and any compound may be used as long as the compound is typically used as a hole injecting/transporting material.

EBL:

An electron blocking layer (EBL) may be used to reduce the number of electrons and/or excitons that leave the emissive layer. The presence of such a blocking layer in a device may result in substantially higher efficiencies, and or longer lifetime, as compared to a similar device lacking a blocking layer. Also, a blocking layer may be used to confine emission to a desired region of an OLED. In some embodiments, the EBL material has a higher LUMO (closer to the vacuum level) and/or higher triplet energy than the emitter closest to the EBL interface. In some embodiments, the EBL material has a higher LUMO (closer to the vacuum level) and or higher triplet energy than one or more of the hosts closest to the EBL interface. In one aspect, the compound used in EBL contains the same molecule or the same functional groups used as one of the hosts described below.

Host:

The light emitting layer of the organic EL device of the present invention preferably contains at least a metal complex as light emitting material, and may contain a host material using the metal complex as a dopant material. Examples of the host material are not particularly limited, and any metal complexes or organic compounds may be used as long as the triplet energy of the host is larger than that of the dopant. Any host material may be used with any dopant so long as the triplet criteria is satisfied.

HBL:

A hole blocking layer (HBL) may be used to reduce the number of holes and/or excitons that leave the emissive layer. The presence of such a blocking layer in a device may result in substantially higher efficiencies and/or longer lifetime as compared to a similar device lacking a blocking layer. Also, a blocking layer may be used to confine emission to a desired region of an OLED. In some embodiments, the HBL material has a lower HOMO (further from the vacuum level) and or higher triplet energy than the emitter closest to the HBL interface. In some embodiments, the HBL material has a lower HOMO (further from the vacuum level) and or higher triplet energy than one or more of the hosts closest to the HBL interface.

ETL:

An electron transport layer (ETL) may include a material capable of transporting electrons. The electron transport layer may be intrinsic (undoped), or doped. Doping may be used to enhance conductivity. Examples of the ETL material are not particularly limited, and any metal complexes or organic compounds may be used as long as they are typically used to transport electrons.

Charge Generation Layer (CGL)

In tandem or stacked OLEDs, the CGL plays an essential role in the performance, which is composed of an n-doped layer and a p-doped layer for injection of electrons and holes, respectively. Electrons and holes are supplied from the CGL and electrodes. The consumed electrons and holes in the CGL are refilled by the electrons and holes injected from the cathode and anode, respectively; then, the bipolar currents reach a steady state gradually. Typical CGL materials include n and p conductivity dopants used in the transport layers.

As previously disclosed, Organic Vapor Jet Printing (OVJP) is a type of technique used to print fine lines of organic material on a display backplane without the use of fine metal shadow masks or liquid solvents, such as for use in OLEDs and other devices. Conventional techniques currently employed to produce mobile and laptop displays typically use evaporation sources and fine metal masks to pattern the deposition. However, fine metal masks are not suitable for use in manufacturing large area displays because the masks cannot be stretched with sufficient force to prevent sagging.

Ink jet printing is a potentially suitable patterning technique for OLED displays, but the use of liquid solvents to make the inks seriously degrades the performance of the light emitting devices. OVJP techniques as disclosed herein may eliminate these two issues by printing lines of OLED materials of pixel width without the use of fine metal masks and using state of the art OLED materials without dissolving them in solvent.

Figure 3:
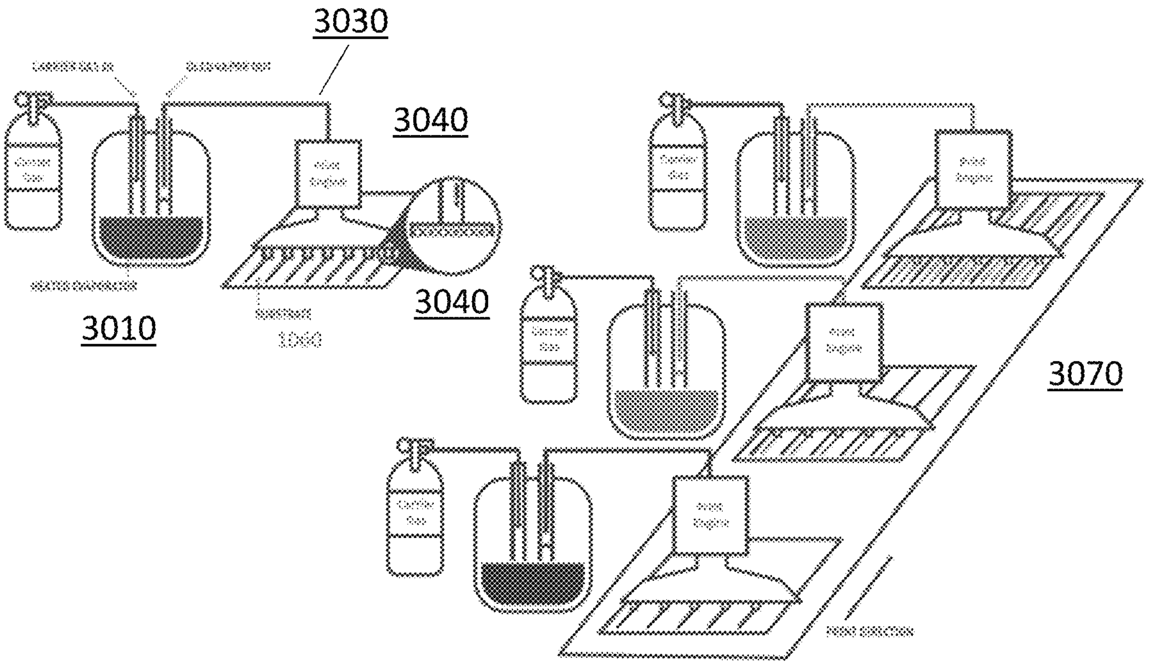
FIG. 3 is a schematic diagram of an OVJP printing process.

In OVJP techniques, OLED materials are heated in an enclosed container to an elevated sublimation temperature and transported to a print head through heated gas lines using an inert carrier gas. FIG. 3 is a schematic diagram of the OVJP printing process showing the basic elements of the process. The print head 3040 contains jetting apertures 3050 with a spacing that corresponds to the pixel spacing of the display. Apertures may be formed in silicon wafers using standard MEMS fabrication techniques and functional OVJP die are cut from the wafer, with the apertures along one face of the die. Organic materials 3010 may be delivered to the die at elevated temperatures in a saturated vapor stream 3030 and excess organic material is removed from the printing area by vacuum channels fabricated in the print die. The aperture face of the die is positioned above a moving display backplane and lines corresponding to the pixels are printed on the backplane 3070.

The gap between the print die and the surface of the backplane may be accurately controlled by measuring the gap in real time and moving the print head relative to the surface of the backplane substrate. OVJP deposition rate changes as the gap between the substrate and print die changes. To achieve a required thickness uniformity of better than 98% (<2% thickness non-uniformity) the gap should be controlled to +/−2 μm. Controlling the gap may be straightforward when the glass substrate is flat to less than 1 μm over the length of the print die. The glass surface can be flattened by using a pair of planar gas bearings; a soft bearing below the glass to float the substrate and a stiffer bearing above glass to flatten the glass. This configuration is for a system that prints with the active glass surface facing upward. For printing with the surface facing downward, the lower gas bearing would be the stiffer bearing.

One method to improve the glass flatness is the use of two opposing planar gas bearings with the glass positioned between the bearings. One bearing adjacent to the back side of the glass is a soft bearing while the bearing adjacent to the front or printed side of the glass is stiff. The stiff bearing bends the glass to take the shape of the top bearing. If the top bearing is flat, the glass top surface will be flat. When used in an OVJP system, the stiff bearing may include access slots for the OVJP print heads. It may be advantageous to make the slots narrow to provide the most flattening force from the bearing. The hot print head will heat the stiff bearing plate around the perimeter of the slot causing the bearing plate to warp and degrade the flatness of the plate and glass substrate. Embodiments disclosed herein may eliminate or significantly reduce heat transfer to the bearing plate from the hot print head.

As previously disclosed, it may be preferred for the slot through the stiffer gas bearing for the print head to be as narrow as possible to maximize the flattening effect of the gas bearing. In an embodiment, no pressure is applied to the glass in the area of the slot opening and the flattening effects of the bearing will be reduced.

A narrow slot may require a narrow print head as shown in FIGS. 4A and 4B. The print head 2010 may be manufactured using a metal closely CTE-matched to the silicon die such as tungsten or molybdenum or a ceramic such as aluminum nitride bonded to the silicon die 2040. For example, the print head may use tungsten metal for the gas manifold and heated surfaces and another metal or ceramic could be used. Two plates of tungsten 2100, 2110 with surfaces "A" 2120, "B" 2130, "C" 2130, "D" 2140 are etched or machined to have channels or vias in the surfaces. Surface "A" has two sets of vias 2200, 2210 machined half-way through the thickness of the plate. The opposite surface "B" 2120 has 2 sets of channels 2220, 2230 milled into the surface to slightly more than half-way through the thickness, so that the channels intersect with the vias in surface "A". The "C" surface 2130 of the second plate 2110 has channels that match the channels in surface "B" and surface "D" 2140 has two slotted vias 2260, 2270 milled into the plate to intersect the two sets of channels 2220, 2230. Vias 2260 and 2270 match the vias on surface "E" 2150 of the OVJP print die. The Tungsten plates may be soldered or brazed together with faces "B" and "C" facing inward so that the milled channels form gas pathways from the injection block 2020 to the print die 2040. The silicon print die is attached to the tungsten manifold by solder, glass frit bonding or another means of attachment. This assembly results in a narrow print die assembly 2010. Tungsten plates and the injection block are heated using resistive heaters attached to their outer surfaces (not shown). In some cases, an external heater may not be required. For example, in the case of an aluminum nitride gas manifold, the heater can be fabricated as part of the gas manifold and will not require external heaters.

Figure 5A:
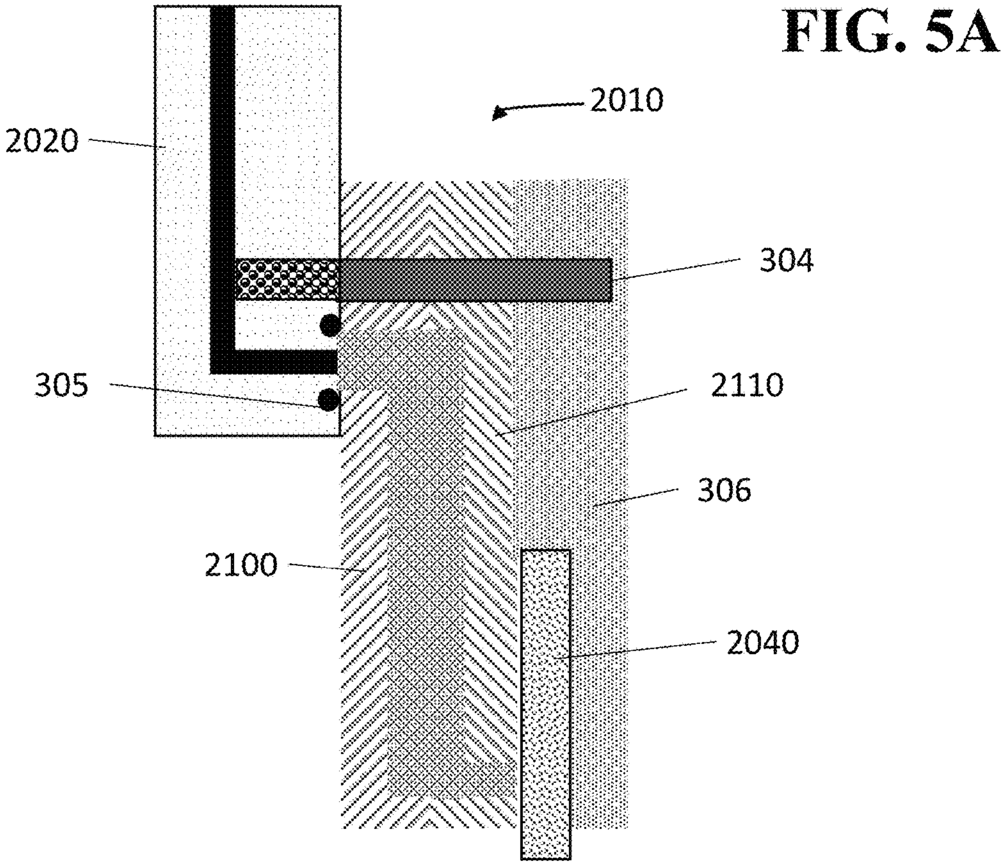
FIG. 5A shows a cross-section view of an OVJP die assembly with heaters on both sides of MEMS die according to embodiments disclosed herein.
Figure 5B:
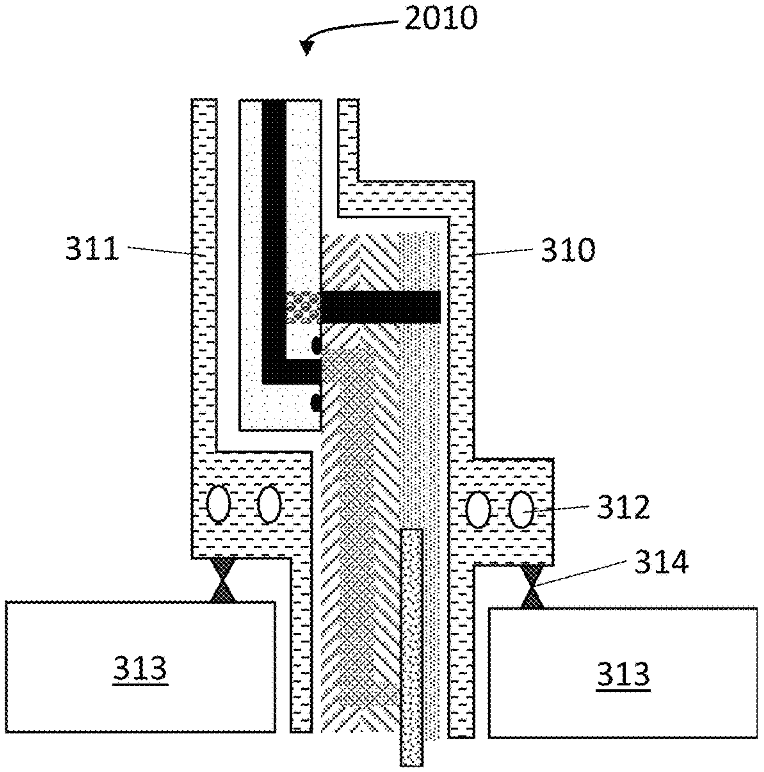
FIG. 5B shows the die assembly of FIG. 5A inserted through a gas bearing plate with heat extraction features according to embodiments disclosed herein.

FIG. 5A shows a similar narrow print head 2010 as shown in FIGS. 4A-4B, with an additional backside heater 306 installed to heat the backside of the die 2040. This print die assembly may be attached to the injection block 2020 using, for example, a c-ring 305 and bolt 304. The backside heater in this example is made from an AIN-tungsten composite in this figure. FIG. 5B shows a narrow print head and backside heater installed through a planar air bearing 313 with integrated cooling jackets 310, 311. The cooling jackets may be constructed from a high thermal conductivity metal such as copper and may be cooled by flowing a fluid such as water through integrated channels 312 machined into the jacket. Low thermal conductivity mounting fixtures 314 may be used to attach the cooling jackets to the gas bearing in such a manner that the temperature of the cooling jacket does not alter the temperature of the gas bearing. Air gaps 315 are used to minimize heat transfer between the hot print head and the cooling jackets and the cooling jacket and gas bearing. Cooling jackets extend to the top of the print head to prevent heating the structure supporting the print head assembly.

Figure 6:
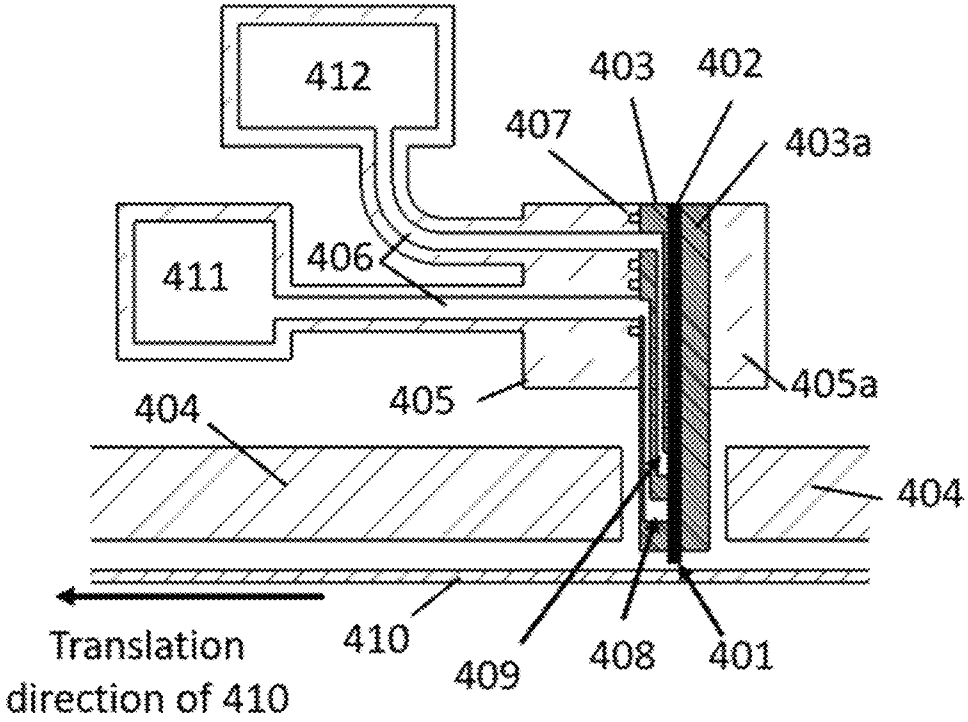
FIG. 6 shows a low profile print head according to embodiments disclosed herein.
Figure 7:
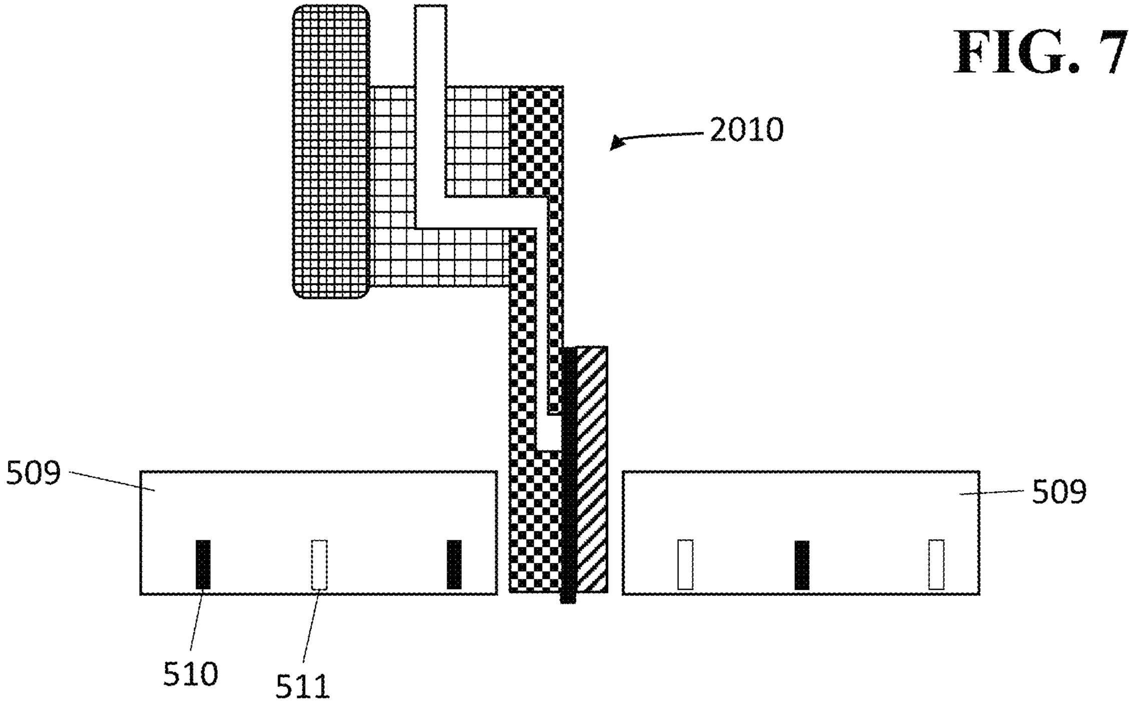
FIG. 7 shows print heads used in conjunction with gas bearings according to embodiments disclosed herein.

FIG. 6 shows a similar print head configuration, but the MEMS die is sealed to the gas manifold using a compression seal rather than by bonding. In this example, a micronozzle array 401 is used, which may be similar to a micronozzle array that is a plane normal to its apertures, and may have one or more delivery apertures in fluid communication with the flow of inert carrier gas and organic vapor. The delivery apertures may be flanked on each side by exhaust apertures that are in fluid communication with the exhaust line. The micronozzle array 401 may be disposed at the edge of a silicon die 402 that is disposed between plates 403. The plates 403 may include a first gas distribution plate and a second opposing plate. The micronozzle array 401, the silicon die 402, and the plates 403 may protrude through a cold plate 404. The micronozzle array 401 may be in proximity to a substrate 410 where the deposition will be targeted. The die 402 may be irreversibly sealed to one or more of the gas distribution and opposing plates using a method such as glass frit, ceramic adhesives, bonding, soldering or brazing. In some embodiments, the die 402 may be attached to a gas distribution plate. The gas distribution plate of plates 403 may be mechanically attached to the interface manifold block 405, and may seal the one or more fluid paths 406 using high temperature seals in a gland feature 407. At least one of the plates 403 has a channel 408 that may feed organic vapor entrained in an inert carrier gas into the die 402 from a manifold connected to one or more organic vapor sublimation sources 411. At least one of the plates 403 may include an exhaust line 409 that connects a via on the die 402 with a low-pressure reservoir 412 to withdraw process gas and surplus organic vapor from a printing zone. As shown, the organic vapor channel 408 and the exhaust line 409 may be drawn through the same plate 403. The opposing plate 403*a* and manifold block 405*a* may not include any internal channels, and, as such, may not use gas tight seals at their interfaces. FIG. 7 shows a print head as shown in FIGS. 4A-5A protruding through an upper gas bearing that has been modified to utilize the print die vacuum flow to locally replace the gas bearing vacuum flow. An air gap 514 may be provided on each side of the print head 2010 for mechanical clearance and to prevent overheating the gas bearing 509. Pressure apertures 510 and vacuum apertures 511 may alternate in the directions parallel and perpendicular to the clot cut into the gas bearing plate. Such an arrangement enables a wider access channel to be fabricated in the gas bearing while retaining glass flattening performance.

The devices shown in FIGS. 3-7 may include a "print engine" or "print bar", which may include multiple print heads. An OVJP deposition device and system as disclosed herein may be adapted for use with any such systems, as will be readily understood by one of skill in the art.

Figure 8:
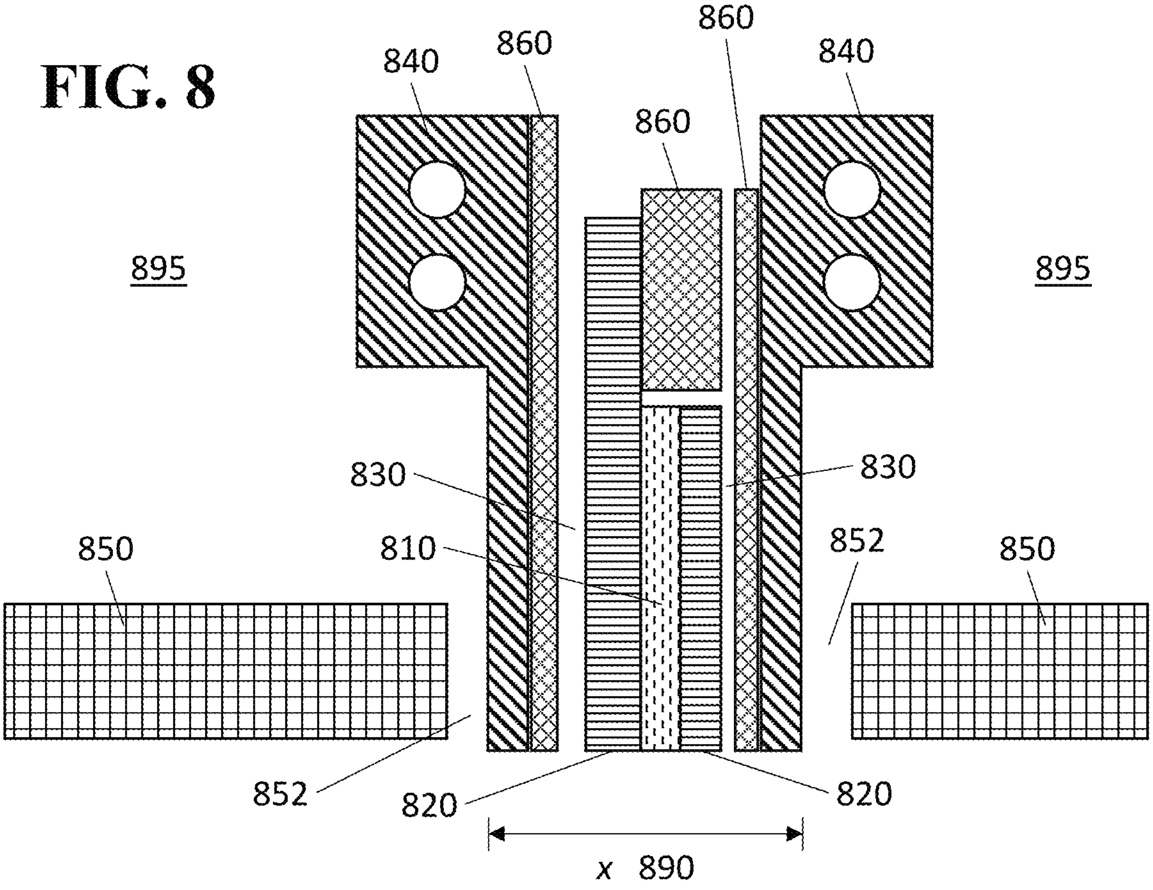
FIG. 8 shows an example embodiment of a print head system as disclosed herein.

FIG. 8 shows an example OVJP device as disclosed herein. The device includes an OVJP nozzle ("print die") 810 as previously disclosed, partially or entirely surrounded by one or more heaters 820 on either side of the nozzle. During operation, the heaters 820 may be used to maintain the print die 810 at a desired temperature, typically in the range of 200-450 C. The heaters 820 may be, for example, aluminum nitride (AlN) heaters or the like. Air gaps 830 separate the heaters from one or more heat sinks 840 on opposite sides of the nozzle. The heat sinks may be, for example, water-cooled copper heat sinks or the like. One or more bearings 850, such as air or other gas bearings, flat plates, or the like, arranged outside the heat sinks 840, may be used to support the print head. The bearings may be separated from the print head assembly and the heat sinks 840 by one or more additional air gaps 852 around the heat sinks 840, or they may be connected to the heat sinks, such as via metal or other connectors having a relatively low thermal conductivity, such as 15 W/mK or less. As disclosed with respect to prior arrangements, the print head may extend through a narrow opening in the bearing(s) 850, and may include channels and vias as previously described, such as to convey organic materials entrained in a carrier gas through the print head to be ejected from the nozzle.

The heat sinks may provide active or passive cooling, or a combination thereof. For example, one or more of the heat sinks may include a passive component such as a block or plate made from copper or similar materials known for providing good thermal conductivity and heat dissipation. One or more heat sinks also may include an active component, such as a water circulation and/or cooling system that moves water or other cooling fluids through the heat sink so as to remove heat from the heat sink.

Figure 9:
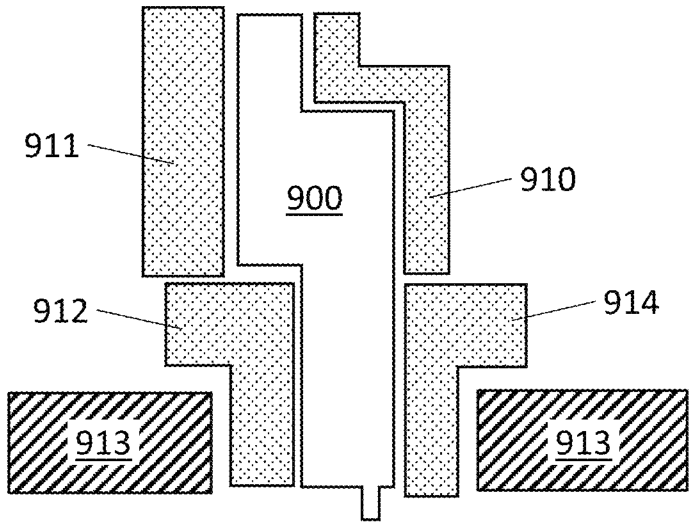
FIG. 9 shows a passively insulated print head concept using metal jacketed multilayer insulation according to embodiments disclosed herein.

Other arrangements of heat sink components may be used. For example, FIG. 9 shows an alternate version of a print head as disclosed herein, in which active water cooling is replaced with metal jacketed multilayer high-performance insulation. The insulation may be jacketed in hermetically sealed metal container to eliminate outgassing in the deposition chamber, especially where deposition is performed under vacuum. The insulation may be attached to the print head 900, which may have the same or similar structure to the print heads previously described with respect to FIGS. 4-9, such that it moves with the print head as the print head is moved vertically within the channel between the bearings 913, or it may be stationary relative to the print head. The insulation 910, 911, 912, 914 may be separated from the print head 700 and bearing plate 913 by air gaps 915.

The combined nozzle structure, including the heat sink(s), heater(s), and nozzle may be relatively small, thus requiring a relatively small opening between the bearings. For example, a maximum horizontal width of the nozzle, surrounding heater(s), and surrounding heat sink(s), may be not more than 15 mm, more preferably 10 mm, more preferably 5-6 mm. The maximum horizontal width of the combined nozzle structure refers to the maximum measurement from outer edge to outer edge, across the nozzle, measured in a direction parallel or essentially parallel to the expected location of the substrate under the nozzle, as shown by the distance×890 in FIG. 8. The heat sinks may include passive and/or active cooling components that extend outward farther than this maximum horizontal width in regions away from the bearings 850, for example in regions 895. Such extensions may be useful, for example, to provide additional space for cooling components such as water channels and connections.

The print head and/or heaters may be moveable within the region between the heat sinks and independently of the heat sinks. That is, the heat sinks 840 may remain stationary relative to the bearings 850, the deposition chamber, or other components of the system, while the print die 810 and/or heater(s) 820 are moved vertically within the region between the heat sinks.

Figure 10:
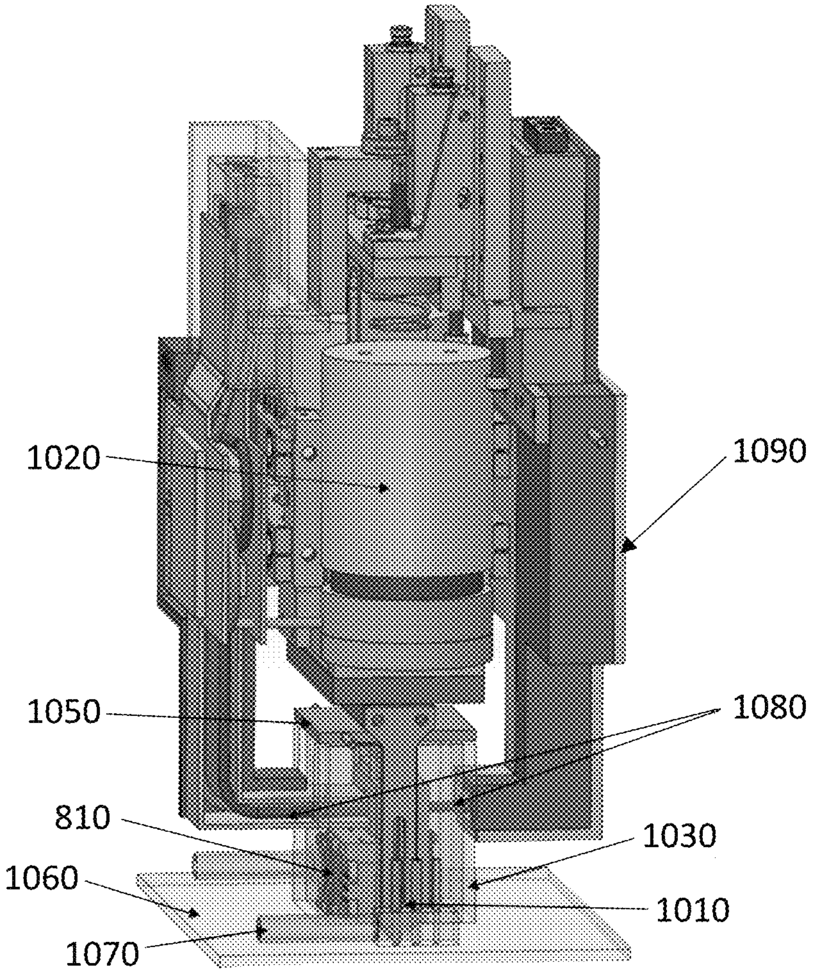
FIG. 10 shows an example of a print head and associated heating/cooling components according to embodiments disclosed herein.

Another way to improve the flatness of a glass substrate as disclosed herein is to use a gas table with a vacuum preloaded bearing or a pressure vacuum (PV) bearing on the back of the substrate in systems printing with the active side facing up. This arrangement typically provides improved control over the gap between the table and the substrate and stiffens the bearing. This approach in principle does not require a top bearing to flatten the glass. As a result, the print head assemblies do not need to fit through narrow slots as previously disclosed, for example with respect to FIG. 8, and the width requirement may be somewhat relaxed. An example of such an arrangement is shown in FIG. 10. As previously disclosed, gas lines 1080 may bring heated carrier gas in which organic material to be deposited on a substrate by the print die 810 is entrained. The gas lines may be enclosed within an insulator or other thermal enclosure 1090. A flight control actuator 1020, such as one or more voice coils, piezoelectric stages, or the like, may be used to control the separation between the print head 810 and the substrate. The flight control actuator 1020 may receive data from a fly height sensor 1010 that measures the substrate-die separation and may otherwise sense the position of the print die 810 relative to the substrate. The print die 810 may be enclosed or otherwise surrounded by an actively-cooled thermal enclosure 1030, such as the heat sinks 840 previously described, and/or other arrangements disclosed herein. Air gaps also may be used to provide separation of the print die 810 from other components of the system and prevent heating of those components, as previously disclosed herein.

While in this configuration there is no top bearing that must be prevented from deforming due the heat generated by the print die, it may still be desirable to minimize the impact of heat generated by the print die the rest of the system. Specifically, temperature-sensitive components such as the fly-height sensors 1010 and flight control actuators 1020 may be susceptible to damage at elevated temperatures (e.g. 30 C.) and therefore should be shielded from the heat generated by the print head 810. In addition, the impact of the heat generated by the print head 810 on the surrounding structures supporting it should be kept as small as possible to minimize any resulting thermal expansion, since this can cause misalignments between the print nozzles and the pixel structures on the glass substrate. Thermal expansion in the heated print head itself is accommodated by a set of identical flexures positioned equidistantly from the center of the head; thermal expansion of the die is taken in account in its design. Finally, the heat generated by the print die 810 can lead to deformations (specifically, an upwards bow) of the glass substrate, which in turn can lead to unwanted variations in the fly height. Therefore, the glass should also be shielded from this heat as much as possible without blocking gas flow to and from the die 810.

Examples of suitable heat shielding solutions include thermal enclosures 1030 that surround the vertical surfaces of the print head 810 on some or all sides. Such enclosures can be made of various types of thermal insulators, such as multi-layer insulation and ceramic fiber materials, but can also include plates of thermally conducting materials, such as copper, with embedded channels through which a cooling fluid, such as water, flows. The actively cooled conductive plates, which can be as thin as 1 mm, are similar to the cooling jackets shielding the top bearing from the heat of the print head and allow the external surface of the enclosure to be safe to the touch, so that fly height sensor adjustments and other manipulations can take place while the print head is hot and thermal expansion of the structures supporting the print head is minimized or reduced. The inside of the enclosure may be plated with a reflective layer, such as Ni or Al, to minimize heating by radiation from the print head. Furthermore, the enclosure 1030 itself may be separated from the print head 810 by a gap, typically at least 1 mm, to minimize conductive/convective heat transfer.

In addition to an enclosure surrounding the vertical faces of the print head, the heat shielding solution may include a section 1050 positioned above the print head 810 to further protect the flight control actuators 1020. The top section 1050 may have the same basic structure as the enclosure 1030, such as a thermal insulation plate or a plate with embedded fluid cooling channels. It is preferred for top section 1050 to include a top cooling plate located above the flexures allowing the print head to expand as it heats up, so that it does not have to accommodate that expansion. The impact of the heat generated in the print head 810 on the glass substrate may be further reduced by a bottom "cold" plate 1060 surrounding the print die and facing the substrate at a distance of up to about 0.5 mm. The cold plate 1060 may be connected to the bottom of the enclosure surrounding the print head 810 and may also contain embedded channels through which cooling fluid flows, as well as inlet and outlet ports and a distribution manifold 1070 for the cooling fluid.

Figure 11:
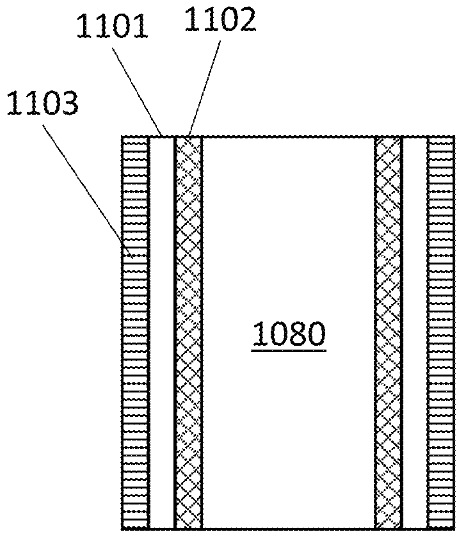
FIG. 11 shows a schematic representation of a section of a heated and insulated gas line according to embodiments disclosed herein.

Aside from the print head itself, the lines 1080 supplying gas to, and exhausting gas from, the print head 810 also need to be heated (to avoid condensation of OLED material in these lines). As in the case of the print head, the rest of the system must be shielded from this heat. In principle, similar solutions to those employed for the print head could be used as shown at 1090. However, a desire or need to integrate heaters and to keep the dimensions small may make an active cooling approach somewhat unpractical. FIG. 11 shows a schematic representation of section of a gas line with an alternative, more compact heating and insulation solution. In this arrangement, one or more evacuated gaps, or vacuum jackets 1101, are arranged between inner heated liners 1102 and the outer thermally conductive shell 1103. The inner heated liner may include, for example, a thermally conductive pipe connected to a heater or the like. The vacuum jacket 1101 minimizes conductive heat losses to the outer shell 1103 of the gas line 1080. The outer shell can in turn be thermally connected to the print head heat shield to maintain the outer shell at a safe temperature.

In some embodiments, the print head may include multiple nozzles, heaters, and/or heat sinks. For example, in some cases an array of two or more nozzles may be used. Adjacent nozzles may be separated by one or more heaters and/or heat sinks, thereby duplicating some or all of the arrangements as shown in FIGS. 8-10. In some embodiments, each nozzle may have associated heaters and/or heat sinks arranged surrounding the nozzle on opposite sides; i.e., there may be multiple heaters and/or heat sinks in the regions between adjacent nozzles. In other embodiments, adjacent nozzles may "share" heaters or heat sinks, such that there is one set of heaters and/or heat sinks in the regions between adjacent nozzles, which provide heating and/or heat removal in the associated regions for each nozzle adjacent to the heaters and/or heat sinks. Individual nozzles may be operable independently of one another or multiple nozzles may be operable in unison. For example, where multiple nozzles are present each nozzle may be operated consecutively without heating or otherwise operating the other nozzles, thereby allowing for sequential deposition of different materials. Alternatively, multiple nozzles may be operated concurrently to allow for concurrent deposition of different materials or of the same material in different locations.

Similarly, some embodiments may include multiple print heads as shown in FIGS. 8-10, each of which may include one or more nozzles, heaters, and/or heat sinks as previously disclosed. As with the nozzles disclosed previously, the multiple print heads may be operated individually or in unison, sequentially or concurrently. Adjacent print heads may be separated by intervening air gaps, thereby forming a repeated pattern array of the print head structures shown in FIGS. 8-10.

Notably, embodiments disclosed herein may allow for operation of an OVJP deposition device that maintains the ambient temperature of the deposition chamber and, in some embodiments, the ambient region between the print head and the substrate, at not more than 40 C. when the print head is in operation, which typically occurs at 200-450 C.

To operate an OVJP print head as disclosed herein, the print head may be heated to a temperature of about 200-450 C., at which point carrier gas and entrained organic material may be ejected from one or more nozzles in the print head to be deposited on a substrate as previously disclosed. By using the heat sinks and air gaps as previously disclosed herein, the local environment around the print head may be cooled to a sufficient degree that the ambient temperature within the deposition chamber (typically a vacuum chamber) will not rise higher than about 40 C. due to operation of the print head.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

We claim:

1. An organic vapor jet printing (OVJP) device comprising:

an OVJP print head comprising:

a nozzle configured to eject an organic material entrained in a carrier gas;

a first heater disposed on a first side of the OVJP print head; and a second heater disposed on a second side of the OVJP print head, wherein the OVJP print head is disposed between the first and second heaters;

a first heat sink disposed adjacent to the first heater and separated from the first heater by a first air gap; and a second heat sink disposed adjacent to the second heater and separated from the second heater by a second air gap, wherein the OVJP print head is movable independently of the first heat sink and the second heat sink.

2. The OVJP device of claim 1, further comprising a first bearing disposed adjacent to the first heat sink.

3. The OVJP device of claim 2, wherein at least a portion of the first bearing is separated from the first heat sink by a third air gap.

4. The OVJP device of claim 2, wherein the first bearing is a gas bearing.

5. The OVJP device of claim 2, wherein the first bearing is a flat plate.

6. The OVJP device of claim 2, wherein the first bearing is attached to the first heat sink with a connector having a low thermal conductivity.

7. The OVJP device of claim 6, wherein the connector has a thermal conductivity of not more than 15 W/mK.

8. The OVJP device of claim 1, wherein at least one of the first and second heat sinks comprises a copper block or plate.

9. The OVJP device of claim 8, wherein at least one of the first and second heat sinks comprises a water cooling system configured to remove heat from the copper block or plate.

10. The OVJP device of claim 9, wherein a total maximum horizontal width of the first heat sink, the first heater, the nozzle, the second heater, and the second heat sink is not more than 15 mm.

11. The OVJP device of claim 10, wherein the total maximum horizontal width is not more than 10 mm.

12. The OVJP device of claim 11, wherein the total maximum horizontal width is not more than 6 mm.

13. The OVJP device of claim 1, wherein the heat sink comprises a block of insulation.

14. The OVJP device of claim 13, wherein the block of insulation is movable in conjunction with the OVJP print head.

15. The OVJP device of claim 13, wherein the block of insulation comprises a multi-layer insulation.

16. The OVJP device of claim 1, further comprising an insulating jacket disposed around one or more gas lines connecting the OVJP print head to one or more sources of carrier gas and organic material, the insulating jacket comprising an internal thermally conductive jacket arranged and configured to heat the one or more gas lines.

17. The OVJP device of claim 16, wherein the insulating jacket comprises a vacuum jacket surrounding the internal thermally conductive jacket.

* * * * *